United States Patent

[11] 3,630,542

| [72] | Inventor | Casimir E. Wycech |
| | | 5941 Argyle, Dearborn, Mich. 48126 |
| [21] | Appl. No. | 41,841 |
| [22] | Filed | June 1, 1970 |
| [45] | Patented | Dec. 28, 1971 |

[54] AUTOMATIC CRASH PAD FOR MOTOR VEHICLES
6 Claims, 5 Drawing Figs.

[52] U.S. Cl. .................................................. 280/150 B, 296/84 K
[51] Int. Cl. .................................................. B60r 21/02
[50] Field of Search ....................................... 280/150 B, 150 R; 296/84 K

[56] References Cited
UNITED STATES PATENTS

| 3,011,823 | 12/1961 | Maher | 296/84 K |
| 3,118,700 | 1/1964 | Von Wimmersperg | 280/150 B |
| 3,188,112 | 6/1965 | Oelkrug | 280/150 B |
| 3,369,838 | 2/1968 | Nelson | 280/150 B |

*Primary Examiner*—Benjamin Hersh
*Assistant Examiner*—Robert R. Song
*Attorney*—Edward M. Apple

ABSTRACT: This application discloses a safety crash shield which is supported in the head liner of a motor vehicle, and arranged to automatically move into protective position in front of the driver and passengers upon impact of the vehicle with another object, at and above a predetermined speed. The invention resides in the particular mounting for the device and in the spring-biased lever for triggering the movement of the pad, and in the shock-absorbing means for backing up the shield when in operative position.

PATENTED DEC 28 1971　　　　　　　　　　3,630,542

DIRECTION OF VEHICLE TRAVEL 5 MILES PER HOUR OR OVER

CASIMIR E. WYCECH
INVENTOR

BY Edward M. Apple

ATTORNEY

AUTOMATIC CRASH PAD FOR MOTOR VEHICLES

This invention relates to safety devices for motor vehicles, and has particular reference to a padded crash shield, which is normally carried in the head liner of the vehicle above the heads of the driver and passengers, and which is automatically triggered into safety position in front of the passengers in the event of a collision.

I am aware that others have worked on this problem and have devised various means to protect the occupants of vehicles, but such devices now known to the public are complicated and leave much to be desired.

It is, therefore, an object of this invention to generally improve devices of that character, and to provide a crash shield which is simple in construction, economical to manufacture, easy to install, and efficient in operation.

Another object of the invention is to provide a device which is inconspicuously mounted in the head liner of the vehicle, and normally out of the way of the occupants.

Another object of the invention is to provide a cushioned resistance to the movement of the crash shield from the protective position.

Another object of the invention is to provide a cushioned resistance to the forward movement of the shield by the impact of the occupants of the vehicle against it.

Another object of the invention is to provide a pivotable device which is spring loaded, which spring-loaded device, together with the weight of the pivoted portion, will cause it to move into protective position instantly, upon an impact of the vehicle at and over speeds of 5 miles per hour.

Another object of the invention is to provide a device of the character indicated which may readily be reset in inactive position after a crash.

Another object of the invention is to provide a device of the character indicated which may be installed in old and new vehicles without major alterations to the vehicle.

Another object of the invention is to provide a device of the character indicated which may easily be modified for particular results by the proper calibration of the spring tension and air cylinder capacities.

The foregoing and other objects of the invention will become more apparent as the description proceeds, reference being made from time to time to the accompanying drawing, forming part of the within disclosure, in which drawing.

Figure 1:
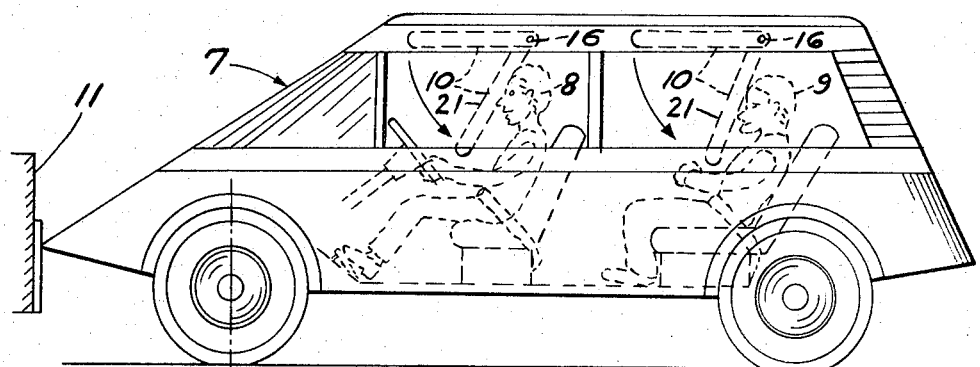
FIG. 1 is a side elevational view of a vehicle equipped with the invention device.

Referring now more particularly to the drawing, it will be understood, that in the embodiment herein disclosed, the reference character 7 indicates in general a motor vehicle, having occupants 8 and 9, who are to be protected by the device 10 embodying the invention. In FIG. 1 the vehicle 7 is shown in collision position with another object 11, which may be another vehicle or immovable object of any type, and illustrates how the invention device 10 is automatically moved into protective position in front of the occupants 8 and 9 at the moment of impact.

The invention device 10 consists of a metal U-shaped frame 12, the ends 13 and 14 of which are outwardly directed and are pivoted in suitable bearing members 15 and 16, which are welded or otherwise suitably secured to the roof of the vehicle 7. The bearing members 15 and 16 are preferably hidden by the conventional head liner of the vehicle. The frame 12 is provided with an offcenter arm 17, which is secured to the frame by welding or other suitable means, approximately in the center thereof. Attached to the arm 17 is one end of an expansion spring 18, the other end of which is secured to an anchor member 19, welded or otherwise secured to the roof of the vehicle, and preferably covered in part by the head liner of the vehicle.

It will be noted that the spring 18 remains above the pivot points 16, exerts an upward pull on the arm 17 in the frame 12, and normally holds the same in unprotective position against the roof of the vehicle, and a stop member 20, which is secured to the roof by welding or other suitable means. The frame 12 is covered by means of a heavy rubber pad or shield 21, which is coextensive with the frame 12 and the area between its pivoted legs. The pad 21 serves as a protective shield for the occupants when the device is moved into protective position (as shown in FIG. 1). The shield 21 is preferably formed with a cutout 22 for the accommodation of the arm 17 and the spring 18.

Figure 2:
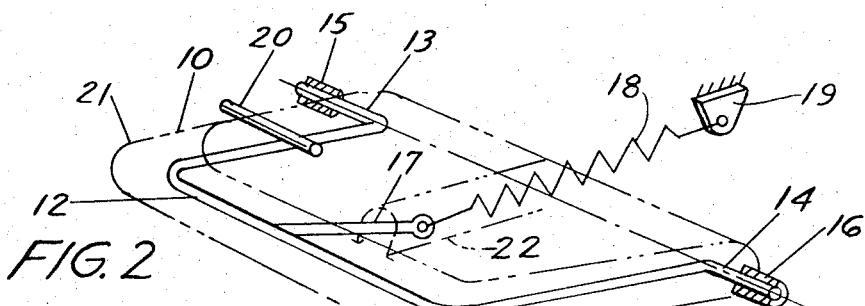
FIG. 2 is an enlarged schematic, perspective view, with parts in section, showing the crash shield in elevated position.

It will be understood that the pull of the spring 18 is sufficient to normally hold the frame 12 and pad 21 in elevated position, as shown in FIG. 2. The spring 18 also urges the frame 12 and the shield 21 in a rearward direction against the pivot points 15 and 16 when in the position shown in FIG. 2. It will also be understood that the weight of the frame 12 and the pad 21 are predetermined, so that upon impact of the vehicle 7 with another object, at speeds above 5 miles per hour, the weight of the frame 12 and pad 21 will be sufficient to overcome the upward pull of the spring 18, and cause the frame 12 and pad 21 to instantly rotate downwardly on the pivots 15 and 16; and after the free end of the arm 17 falls below the plane in which lie the pivot points 15 and 16, the spring 18 will then exert force to pull the frame 12 and pad 21 rearwardly and downwardly into the position shown in FIG. 1.

Figure 3:
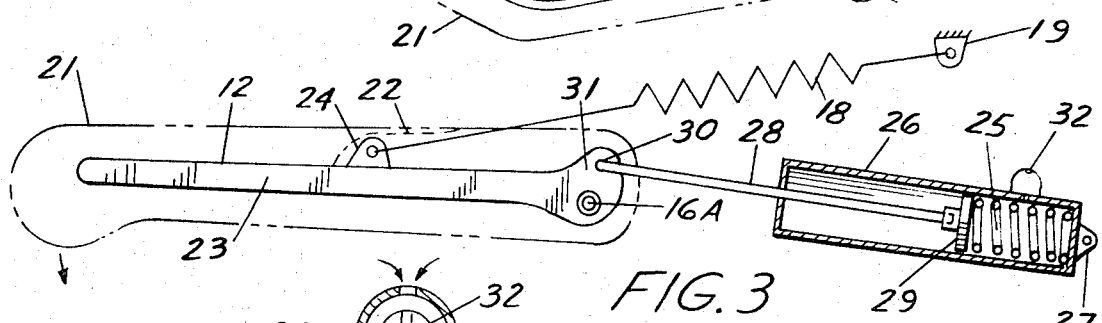
FIG. 3 is an enlarged elevational view, with parts in section, showing the device of FIG. 2, with spring-loaded air cylinder attached.

In FIG. 3 I have shown a modified form of the device, in which the frame 12 is provided with side members 23, which are pivoted as at 15A and 16A. In this modification each member 23 is provided with a lug 24, which receives one end of the spring 18, as previously described. In addition to the expansion springs 18, I provide a compression spring 25, which is encased in an air cylinder 26, one end of which is pivoted as at 27, to the vehicle roof, as previously described. The cylinder 26 is provided with a pushrod 28, at one end is a piston 29, against which the spring 25 exerts its pressure. The opposite end of the pushrod 28 is connected, as at 30, to a lobe 31 formed at the end of the side member 23. In this embodiment the spring 25 exerts its pressure on the pushrod 28, which in turn tends to rock the arm downwardly after the arm has been pivoted beyond its locking position on the pivot 16A, as previously described.

It will be understood that the tension of the spring 18 is sufficient to hold the frame 12, arm 23, and the pad 21 in the locked position on the pivots 16A, and upon impact at a predetermined speed, the weight of the frame 12 and the pad 21 will overcome the tension of the spring 18, permitting the frame and pad to move beyond the locking point, where the tension on the spring 18 and the expansion pressure of the spring 25, will cause the frame and pad to move into the protective position (shown in FIG. 1).

Figure 4:
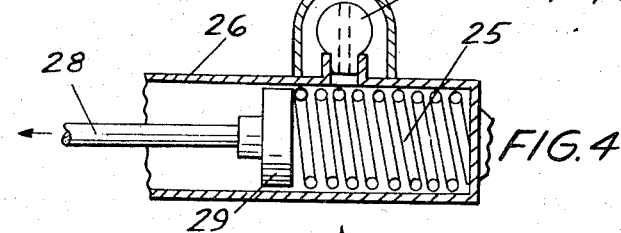
FIG. 4 is an enlarged, fragmentary section of a modified form of air control, showing the flow of air as the piston moves in one direction.
Figure 5:
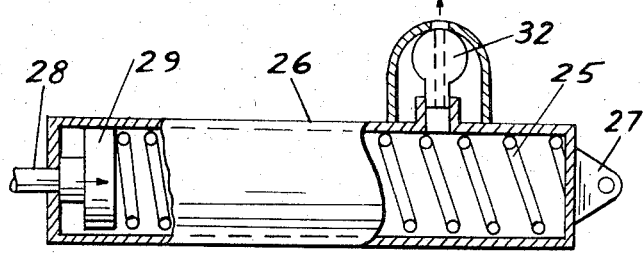
FIG. 5 is a view similar to FIG. 4, but showing the flow of air as the piston moves in the opposite direction.

It will be understood that the cylinder 26 is provided with a check valve 32, which allows air to enter the cylinder 26 on the spring side of the piston 29, as the piston 29 is moved outwardly under the influence of the spring 25 (as shown in FIG. 4). When the piston 29 reaches the limit of its outward travel (as shown in FIG. 5), the spring 25 and the air in the cylinder on the spring side of the piston 29, will resist the return movement of the frame 12 and the pad 21, a sufficient length of time to protect the occupants 8 and 9 against any forward movement, as a result of the impact. This resistance to the return movement of the frame 12 and pad 21 can be overcome by slowly lifting the frame and pad, so that the piston 29 causes the air to escape through the restricted passage in the check valve 32, at the same time exerting sufficient pressure on the spring 25 to overcome its expansive pressure. With this arrangement the frame 12 and pad 21 may again slowly be returned to its inactive position in the head liner of the vehicle.

It is believed that the operation of the device is obvious from the foregoing description.

Having described my invention, what I claim and desire to secure by Letters Patent is:

1. A safety device for a motor vehicle comprising a frame covered with a padded shield material, said frame being pivoted at its ends in bearing members secured to the underside of the top of the vehicle, and a spring secured at one end to an anchor element carried by the said top, and positioned to the rear of said frame pivots, said spring being secured at the other end to an element on said frame positioned forward of said pivots said spring being arranged to initially exert force on said frame and its pivots to hold said frame upwardly and forwardly inclined in inactive position, and secondly to exert force on said frame to move and hold said frame in active, forwardly and downwardly inclined position on said pivots, after the front portion of said frame has moved downwardly past the horizontal plane in which said pivots are positioned.

2. The structure of claim 1, in which the inactive position of said front portion of said frame is substantially parallel to the top of the vehicle, and above and slightly ahead of the occupants of said vehicle, and the active position of said frame is substantially vertical to the said top and in resilient contact with the occupants of said vehicle.

3. The structure of claim 1, in which the tension of said spring is such that it is overcome momentarily by the weight of the frame, should the forward movement of the vehicle, in excess of 5 miles per hour, be suddenly stopped.

4. The structure of claim 1, in which said frame is provided, in addition to said spring, with an air cylinder which is pivoted to a member secured to said top, said cylinder having a push rod which is secured at one end to a lug on said frame, positioned above the pivot point of said frame and secured at the other end to a piston in said cylinder.

5. The structure of claim 4, in which the piston of said cylinder is urged in at least one direction by means of a spring.

6. The structure of claim 1, in which said frame is substantially U-shaped and has its ends turned outwardly to form pivots which are received in bearings secured to the vehicle top and partially concealed by the head liner of the vehicle.

* * * * *